US012632322B2

(12) United States Patent
Henry et al.

(10) Patent No.: US 12,632,322 B2
(45) Date of Patent: May 19, 2026

(54) ACTOR-BASED FRAMEWORK FOR COMMUNICATION BETWEEN SOFTWARE SYSTEMS FOLLOWING THIRD-PARTY FAILURE

(71) Applicant: Biosero Inc., San Diego, CA (US)

(72) Inventors: Prabhakar Henry, San Diego, CA (US); William Berg, Warner Robins, GA (US); Corey McCoy, Prescott, AZ (US); Lloyd A. Corkan, Louisville, CO (US); Andrew St. Yves, Colchester (GB); Jonathan David Dambman, San Diego, CA (US)

(73) Assignee: Biosero Inc., San Diego, CA (US)

( * ) Notice: Subject to any disclaimer, the term of this patent is extended or adjusted under 35 U.S.C. 154(b) by 678 days.

(21) Appl. No.: 17/657,707

(22) Filed: Apr. 1, 2022

(65) Prior Publication Data

US 2022/0318080 A1 Oct. 6, 2022

Related U.S. Application Data

(60) Provisional application No. 63/170,794, filed on Apr. 5, 2021.

(51) Int. Cl.
| | |
|---|---|
| *G06F 9/54* | (2006.01) |
| *G06F 9/48* | (2006.01) |

(Continued)

(52) U.S. Cl.
CPC ............ *G06F 9/546* (2013.01); *G06F 9/4881* (2013.01); *G06F 9/542* (2013.01); *H04L 67/561* (2022.05); *H04L 69/326* (2013.01)

(58) Field of Classification Search
CPC ........ G06F 9/546; G06F 9/4881; G06F 9/542; H04L 69/326

(Continued)

(56) References Cited

U.S. PATENT DOCUMENTS

| | | |
|---|---|---|
| 7,721,303 B2 | 5/2010 | Alves et al. |
| 8,874,685 B1 | 10/2014 | Hollis et al. |

(Continued)

OTHER PUBLICATIONS

WIPO, PCT Form ISA210, International Search Report for International Patent Application Serial No. PCT/US2022/01510, pp. 3 (Jun. 21, 2022).

(Continued)

*Primary Examiner* — Pierre Vital
*Assistant Examiner* — Jordan Scott Motter
(74) *Attorney, Agent, or Firm* — UltimatEdge IP Law Group, P.C.; Dean G. Stathakis

(57) ABSTRACT

A software framework for implementation in the performance of automated robotic workflows establishes a peer-to-peer communications structure between applications operating on different computing platforms within the same workflow environment. The software framework instantiates a messaging protocol within a remote actor-based model that separates server-side activity that includes third-party software controlling third-party instruments from client-side activity that includes scheduling software controlling workflows within the automated workflow environment. This framework promotes continuous messaging across the different computing platforms and enables a restart of the third-party software following an exception or fail state experienced by the server-side workflow elements without interruption to the automated workflow environment.

21 Claims, 4 Drawing Sheets

(51) Int. Cl.
  *H04L 67/561*     (2022.01)
  *H04L 69/326*     (2022.01)
(58) Field of Classification Search
  USPC ......................................................... 718/100
  See application file for complete search history.

(56)               References Cited

U.S. PATENT DOCUMENTS

| | | | |
|---|---|---|---|
| 9,406,022 B2* | 8/2016 | Damm ................... | G06N 20/00 |
| 2002/0004856 A1* | 1/2002 | Sudarshan ............. | H04L 67/56 |
| | | | 719/330 |
| 2005/0044242 A1* | 2/2005 | Stevens .................. | H04L 67/02 |
| | | | 709/228 |
| 2007/0028244 A1* | 2/2007 | Landis .................. | G06F 9/4555 |
| | | | 718/108 |
| 2010/0138534 A1* | 6/2010 | Mutnuru ............. | H04L 43/0817 |
| | | | 709/224 |
| 2012/0173612 A1 | 7/2012 | Vegesna-Venkata et al. | |
| 2013/0297680 A1* | 11/2013 | Smith ................... | H04L 67/535 |
| | | | 709/217 |
| 2015/0067819 A1* | 3/2015 | Shribman ............... | H04L 67/02 |
| | | | 709/218 |
| 2017/0078270 A1* | 3/2017 | Tang ................... | H04L 63/0815 |

OTHER PUBLICATIONS

WIPO, PCT Form ISA237, Written Opinion for International Patent Application Serial No. PCT/US2022/01510, pp. 14 (Jun. 21, 2022).

* cited by examiner

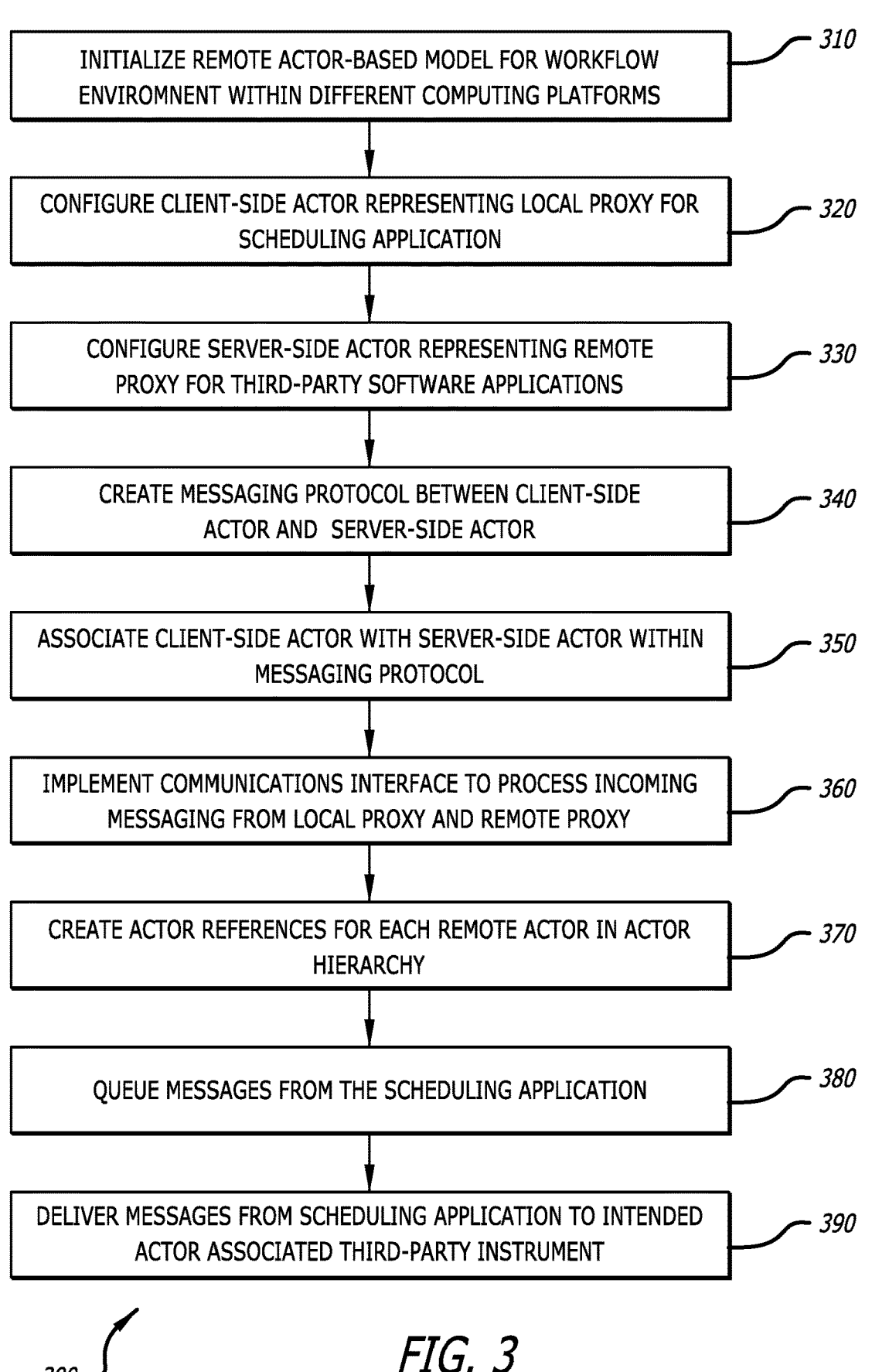

INITIALIZE REMOTE ACTOR-BASED MODEL FOR WORKFLOW ENVIROMNENT WITHIN DIFFERENT COMPUTING PLATFORMS — 310

CONFIGURE CLIENT-SIDE ACTOR REPRESENTING LOCAL PROXY FOR SCHEDULING APPLICATION — 320

CONFIGURE SERVER-SIDE ACTOR REPRESENTING REMOTE PROXY FOR THIRD-PARTY SOFTWARE APPLICATIONS — 330

CREATE MESSAGING PROTOCOL BETWEEN CLIENT-SIDE ACTOR AND SERVER-SIDE ACTOR — 340

ASSOCIATE CLIENT-SIDE ACTOR WITH SERVER-SIDE ACTOR WITHIN MESSAGING PROTOCOL — 350

IMPLEMENT COMMUNICATIONS INTERFACE TO PROCESS INCOMING MESSAGING FROM LOCAL PROXY AND REMOTE PROXY — 360

CREATE ACTOR REFERENCES FOR EACH REMOTE ACTOR IN ACTOR HIERARCHY — 370

QUEUE MESSAGES FROM THE SCHEDULING APPLICATION — 380

DELIVER MESSAGES FROM SCHEDULING APPLICATION TO INTENDED ACTOR ASSOCIATED THIRD-PARTY INSTRUMENT — 390

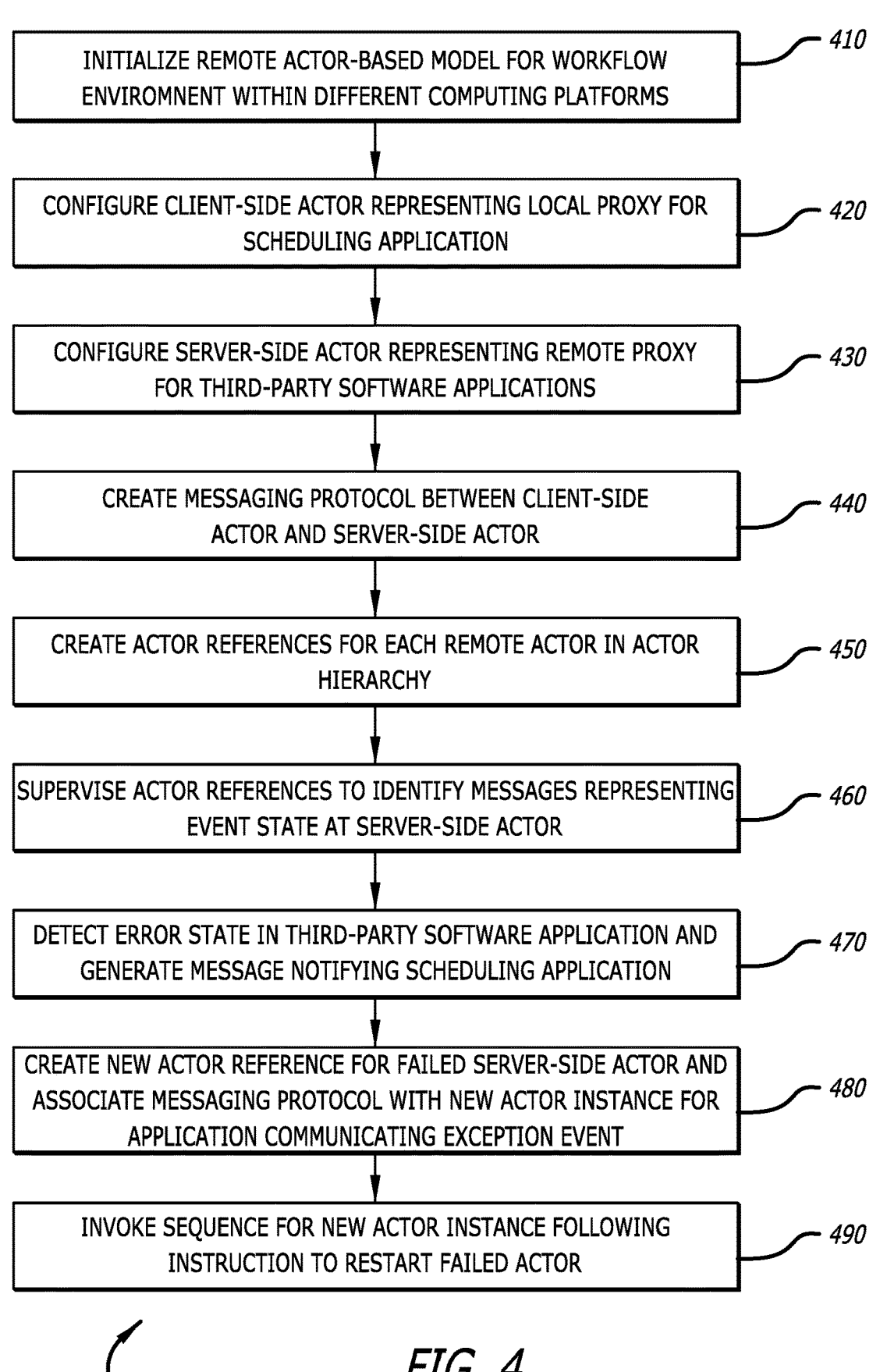

410 — INITIALIZE REMOTE ACTOR-BASED MODEL FOR WORKFLOW ENVIROMNENT WITHIN DIFFERENT COMPUTING PLATFORMS

420 — CONFIGURE CLIENT-SIDE ACTOR REPRESENTING LOCAL PROXY FOR SCHEDULING APPLICATION

430 — CONFIGURE SERVER-SIDE ACTOR REPRESENTING REMOTE PROXY FOR THIRD-PARTY SOFTWARE APPLICATIONS

440 — CREATE MESSAGING PROTOCOL BETWEEN CLIENT-SIDE ACTOR AND SERVER-SIDE ACTOR

450 — CREATE ACTOR REFERENCES FOR EACH REMOTE ACTOR IN ACTOR HIERARCHY

460 — SUPERVISE ACTOR REFERENCES TO IDENTIFY MESSAGES REPRESENTING EVENT STATE AT SERVER-SIDE ACTOR

470 — DETECT ERROR STATE IN THIRD-PARTY SOFTWARE APPLICATION AND GENERATE MESSAGE NOTIFYING SCHEDULING APPLICATION

480 — CREATE NEW ACTOR REFERENCE FOR FAILED SERVER-SIDE ACTOR AND ASSOCIATE MESSAGING PROTOCOL WITH NEW ACTOR INSTANCE FOR APPLICATION COMMUNICATING EXCEPTION EVENT

490 — INVOKE SEQUENCE FOR NEW ACTOR INSTANCE FOLLOWING INSTRUCTION TO RESTART FAILED ACTOR

ACTOR-BASED FRAMEWORK FOR COMMUNICATION BETWEEN SOFTWARE SYSTEMS FOLLOWING THIRD-PARTY FAILURE

This application is a 35 U.S.C. § 111 patent application that claims the benefit of priority and is entitled to the filing date pursuant to 35 U.S.C. § 119(e) of U.S. Provisional Patent Application 63/170,794, filed Apr. 5, 2021, the content of which is hereby incorporated by reference in its entirety.

FIELD

The present invention relates to the field of robotics and performance of automated processes. Specifically, the present invention relates to an approach that enables improvements in communications between scheduling software and third-party software used in such automated processes across different computing platforms, and that enables handling of third-party software restarts following exception states that represent crashes or hangs of such third-party software.

BACKGROUND

In the life sciences industry, in order to automate experiments using robotics, scheduling software operates as a workflow engine, and is applied to organize steps in executing complex workflows. Scheduling software must also integrate third-party instruments, which are typically controlled by their own software. Such scheduling software, and software controlling third-party instruments, are often performed on different computing platforms, and therefore control of third-party instruments occurs through their local computer-based software. The only way to communicate with third-party instruments in such a case is to use some inter-PC communication mechanism between the computer running the scheduling software and the computer running the third-party instrument and/or performing a workcell.

Additionally, integration of third-party instruments is often difficult due to differences in the quality of the software, which can lead to software crashes and unpredictable behavior both at the device level and throughout the workflow environment. Also, many of the software application or components used by third-party instruments may have been developed many years previously and may or may not have been comprehensively updated over time, and further may run on older operating systems, all of which leaves them prone to hacking or virus attacks. Together with performance on different computing platforms, such issues make these third-party instruments, and their software systems, extremely unstable for integration with scheduling software.

Existing approaches attempt to address the issues occurring due to the use of different computing platforms by utilizing communication mechanisms which are complicated to use due at least in part to different software specifications employed on each computer. For example, current implementations of communications mechanisms utilize some communication protocol, such as RS-232, TCP/IP, etc., or using a Windows service (such as Windows Communication Framework, or WCF), to communicate with third-party software. Such implementations, however, are prone to errors due to fundamental differences between each computing platform, and also do not address restarts of third-party software when that third-party software crashes or hangs. Existing approaches therefore do not provide effective strategies for resolving differences between systems on different computing platforms, and do not provide effective strategies for handling restarts when the third-party software crashes or hangs, each of which cause latency in the overall processes and instability between the scheduling software and the third-party software. Still further, the set up and maintenance of such communications mechanisms is non-trivial, time-consuming, and expensive.

Therefore, there is a continuing need in the existing art for an approach to communications between scheduling software and third-party software that are run on different computing platforms for performance of automated workflows, to reduce complexities and errors between such software systems. There is also a continuing need in the existing art for an approach in which scheduling software can withstand failures in third-party software in a safe and predictable way, and reliably restart (or stop) such third-party software in the event of a crash, hang, or other error state, and without compromising the integrity of such automated workflows.

SUMMARY

The present invention provides a novel approach to communications involving different software systems and different computing platforms involved in performing automated, robotic workflows. The approach of the present invention utilizes a remote actor-based model as a communications structure between scheduling software (which includes, and is also referred to herein as, a scheduling application or applications), and third-party software (which includes, and is also referred to herein as a third-party software application or applications) running on computers that are remote from those running the scheduling software, and operating on different platforms or networks. This approach provides a seamless communication mechanism that hides complexities associated with communication protocols that are typically utilized between such software systems, and also provides an elegant and efficient way to restart third-party software if it crashes or hangs, without comprising the integrity of automated workflows or interrupting performance of such workflows.

The present invention is a software framework for implementation in the performance of automated robotic workflows that includes an instantiation of a communications structure between different computing platforms, utilizing a remote actor-based model as noted above. This communications structure includes an actor hierarchy comprising a client-side, local actor proxy coupled to the scheduling software, and a server-side, remote actor proxy coupled to third-party software, enabling the scheduling software to talk to the remote third-party software across the different computing platforms using different communications protocols.

The local actor proxy and the remote actor proxy together provide an interface between the different software systems on different computing platforms, that enables modeling of the components of the computing environments in which they are implemented as stateful computational entities that communicate with each other through the passing of explicit messages. The interface provided by the remote actor-based model allows for creation of a messaging protocol enabling the passing of these messages without worrying about, or having to address, the complexities of existing communications protocols themselves. The remote actor-based model also enables messaging between different computing platforms without having to account for the different coding protocols involved in the different software systems on each side, so that nuances in the different computing platforms on which the scheduling application and third-party software applications operate do not interrupt performance of workflows in an automated workflow environment.

Instantiation of a remote actor-based model in such an environment enables components on each of the client side and server side to act as computational entities, and communicate with each other using asynchronous messaging instead of method calls, as well as independently manage their own states. In such a remote actor-based model, when responding to a message, actors may create other subsidiary (child) actors, send messages to those other actors, and stop actors (or themselves) as appropriate. As computational entities, they are capable of multi-threaded behavior without the use of low-level concurrency constructs such as atomics or locks, and eliminate any memory visibility issues. They also enable transparent remote communication between systems and their components, and the user does not need to write or maintain difficult networking code for such communications.

Actor models are typically used to implement microservices and distributed applications in cloud computing environments, such as with Microsoft Azure, Amazon Web Services, or with web-based servers generally. But the benefits of using actor models in such environments are also applicable to, and may be realized with regard to, a workcell that comprises devices and instruments configured to perform experiments. This is because the actor models, and remoting functions within such models, allow for implementation of an agnostic communications interface, so that systems operating on their local computer-based software and on different computing platforms from each other are able to communicate as computational entities, rather than using method calls or APIs, and so that restarting such devices in the event of exception systems that are indicative of crashes and hangs can occur without comprising system-wide integrity or corrupting workflows.

It is therefore one objective of the present invention to provide systems and methods for enabling communications between scheduling software and third-party software in the performance of automated robotic workflows. It is another objective to provide systems and methods for enabling communications between scheduling software and third-party software, where each is performed on a different computing platform, and/or where the third-party software is performed on systems remote from those performing the scheduling software.

It is a further objective of the present invention to provide systems and methods of implementing a messaging protocol in an interface that serves as a communications structure between software systems on different computing platforms, where the interface is comprised of an actor-based model having remoting functions. It is further objective of the present invention to provide systems and methods of implementing such a messaging protocol between client-side components and server-side components in the performance of workflows in an automated workflow environment, such as where such workflows are performed at least in part by robotic equipment. It is further objective of the present invention to provide systems and methods of instantiating a remote actor-based model for such a messaging protocol so that messaging occurs between computational entities representing client-side components and server-side components on such different computing platforms, rather between systems in an API-based environment.

It is still a further objective of the present invention to provide systems and methods of managing system failures occurring in third-party instruments in such workflow environments, where scheduling software and third-party software controlling such instruments are configured on different computing platforms. It is another objective of the present invention to provide systems and methods of managing system failures occurring in third-party instruments in such workflow environments where a remote actor-based model has been instantiated to represent the scheduling software and third-party software controlling such instruments. It is still another objective of the present invention to provide systems and methods of preventing interruptions in automated workflows due to such failures, and reducing recovery time during such failures that result from inconsistencies in communications protocols between scheduling software and third-party software operating on such different computing platforms. It is yet another objective of the present invention to provide systems and methods of restarting third-party instruments in the event of failures from crashes, hangs, and other error states in a way that does not compromise the integrity of the automated workflows using such a remote actor-based model.

Other objects, embodiments, features and advantages of the present invention will become apparent from the following description of the embodiments, taken together with the accompanying drawings, which illustrate, by way of example, the principles of the invention.

BRIEF DESCRIPTION OF THE DRAWINGS

The accompanying drawings, which are incorporated in and constitute a part of this specification, illustrate aspects of the disclosed subject matter in at least one of its exemplary embodiments, which are further defined in detail in the following description. Features, elements, and aspects of the disclosure are referenced by numerals with like numerals in different drawings representing the same, equivalent, or similar features, elements, or aspects, in accordance with one or more embodiments. The drawings are not necessarily to scale, emphasis instead being placed upon illustrating the principles herein described and provided by exemplary embodiments of the invention. In such drawings:

FIG. 3 is a flowchart of steps performed in a process for implementing a remote actor-based model for reducing complexities in communications between scheduling software and third-party software, according to another aspect of the present invention; and FIG. 4 is a flowchart of steps performed in a process for restarting third-party software where a remote actor-based model is implemented between scheduling software and such third-party software, according to another embodiment of the present invention.

DETAILED DESCRIPTION

Figure 1:
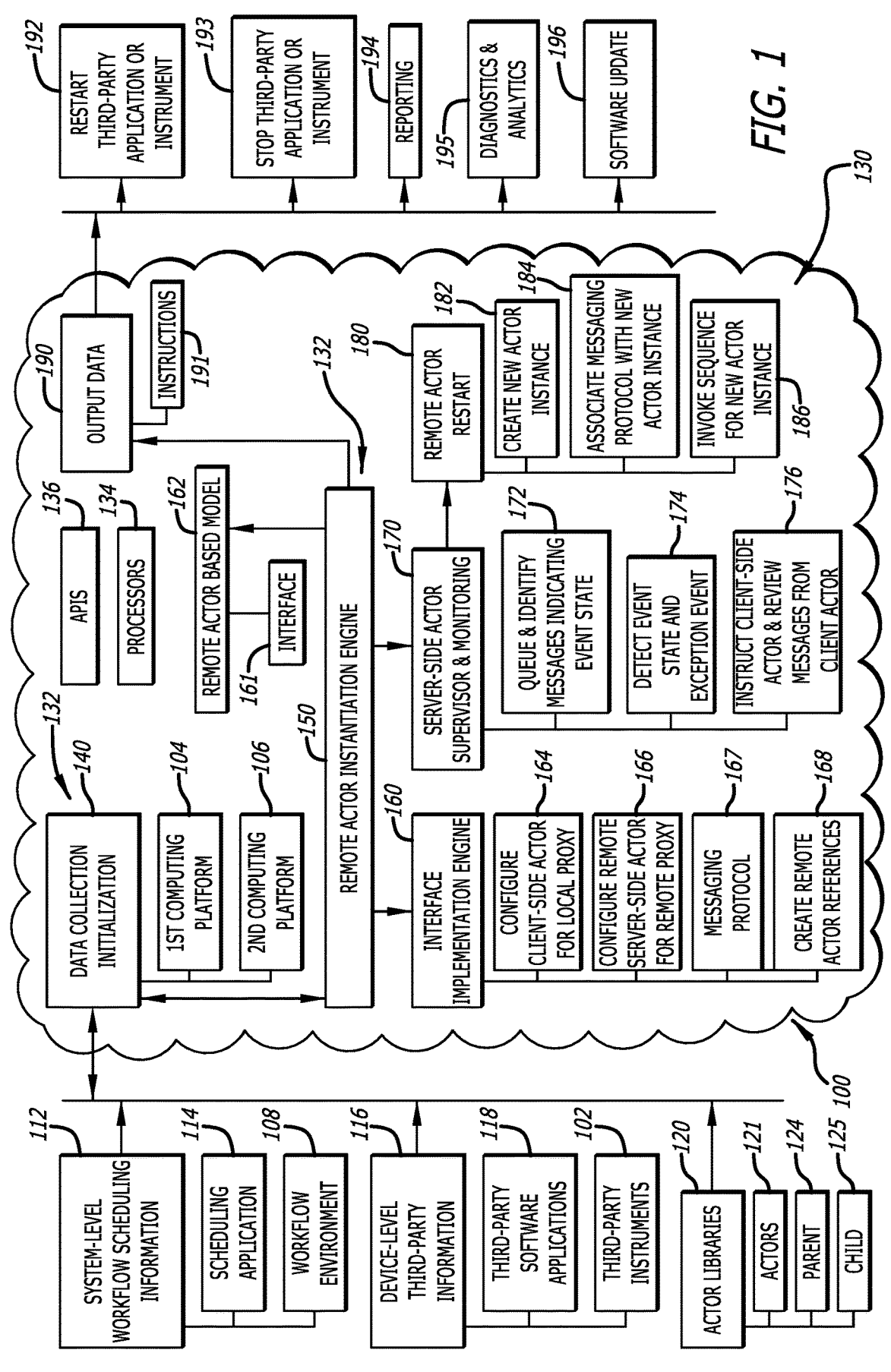
FIG. 1 is a systemic diagram of a software framework for reducing complexities in communications between scheduling software and third-party software using a remote actor-based model, according to one aspect of the present invention.

In the following description of the present invention reference is made to the exemplary embodiments illustrating the principles of the present invention and how it is practiced. Other embodiments will be utilized to practice the present invention and structural and functional changes will be made thereto without departing from the scope of the present invention.

The present invention is a framework 100 for reducing complexities in communications between a client-level workflow engine, and scheduling software operative therein, and server-level third-party software controlling one or more third-party instruments 102 in the performance of automated workflows in a workflow environment 108. Framework 100 is performed within one or more systems and/or methods, that include several processing elements each of which define distinct activities and functions involved in facilitating communications between scheduling software and third-party software operating on the different computing platforms, during performance of automated workflows involving multiple tasks and experiments using devices or instruments (robotic or otherwise) that operate based on such third-party software. It is to be understood that the term "scheduling software" as used in the present specification also includes one or more client-side scheduling applications, and that the term "third-party software" as used in the present specification also includes one or more server-side, instrument-based third-party software applications.

Also as noted above, when scheduling software associated with workflow engine drivers communicate with instruments that are controlled by server-side and/or instrument-based, third-party software applications using vendor-provided libraries and other such software tools, the scheduling software often utilizes method calling via application programming interfaces (APIs) to communicate with and control the third-party instrument and its associated software applications. This is particularly true where such scheduling software and third-party software are configured on different computing platforms within the same workflow environment, as these computing platforms are controlled through their respective local computer-based software and have different software specifications associated with each computing platform.

Framework 100 of the present invention implements a remote actor-based approach that addresses this problem and allows scheduling software to communicate with the third-party software across such different computing platforms, and without having to address the complexities associated with both ensuring that messages reach their intended audience, and with avoiding system crashes and hangs that arise from such complexities. Such a remote actor-based approach creates an interface between client-side elements and server-side elements across which a messaging protocol is implemented that reduces such complexities, effectively running a client-side scheduling application(s) and server-side third-party software application(s) as separate processes. As explained below, this is accomplished by allowing each of the scheduling application and the third-party software application to run as actors within an actor-based system, and imparting remoting functions that create an interface and allow for establishment of a messaging protocol that enables communications using the interface, thereby removing the need for method-based APIs calls and other, differing communications protocols in the different computing platforms involved in the overall workflow environment 108.

Figure 2:
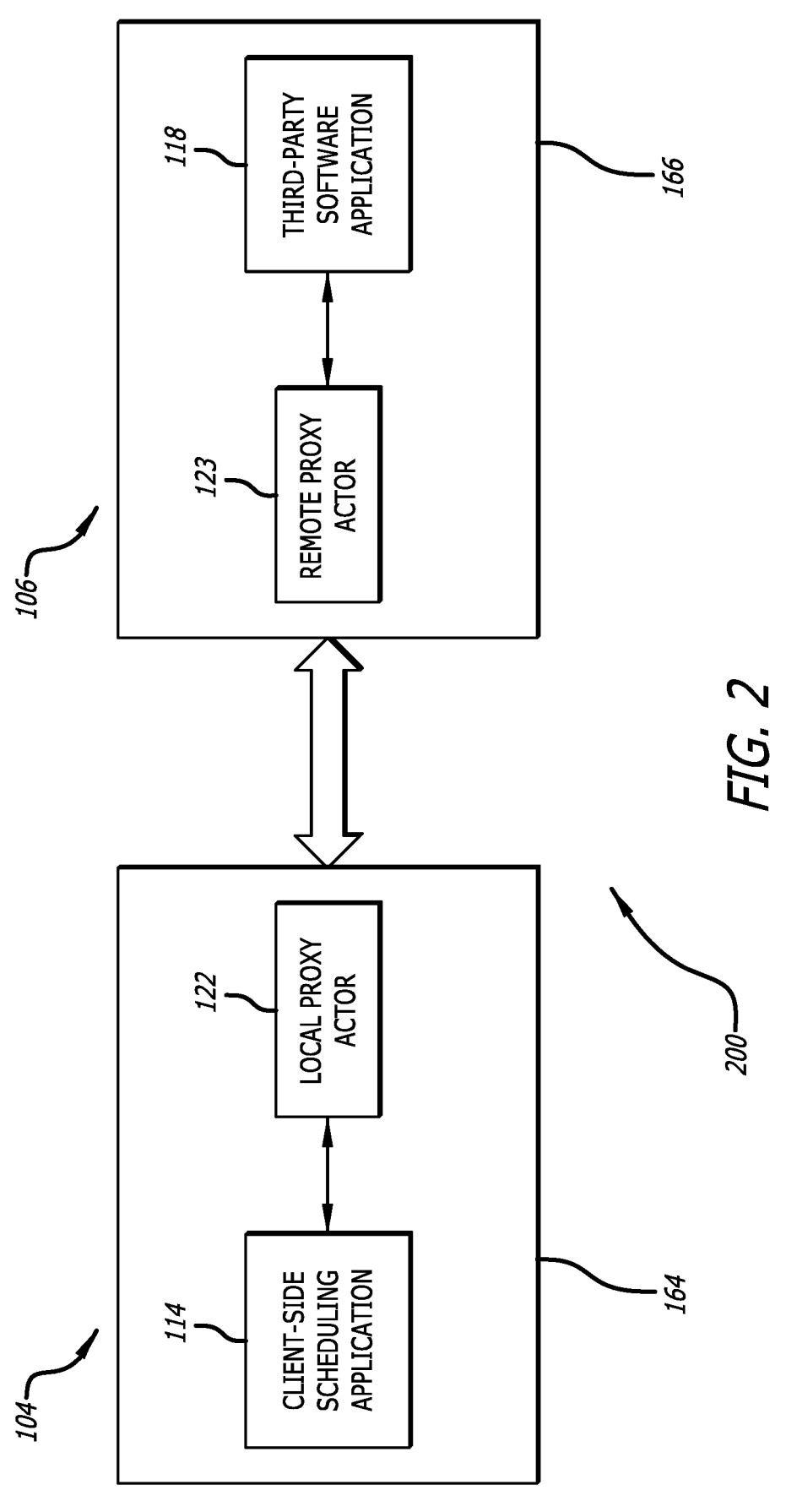
FIG. 2 is a further diagram of system elements in the software framework of FIG. 1.

In addition, and as shown in FIG. 2 and with reference to FIG. 1, all actors 121 in a remote actor-based model 162 are arranged as either a system-level, client-side actor(s) 164 as a local proxy actor 122 on a first computing platform 104, or a server-side actor(s) 166 as a remote proxy actor 123 on a second computing platform 106. This enables supervisory and monitoring functions as described below, at least so that when the third-party software application 118 crashes, an actor supervisor and monitoring element 170 identifies and handles an exception state, communicates a message to the local proxy actor 122 representing the client-side scheduling application 114, and manages a process for restarting the third-party software application 118.

FIG. 1 is a system diagram of framework 100 for reducing complexities in communications between scheduling software and third-party software that controls, or is used by, one or more third-party instruments 102 in the performance of automated workflows, as noted above. Framework 100 receives, ingests, requests, or otherwise obtains input data 110 that includes scheduling information 112 representing execution of workflow steps, automated or otherwise, in workflow environment 108, such as for example from one or more scheduling applications 114. Input data 110 also includes device-related information 116 in one or more third-party software applications 118, which govern operation of one or more third-party instruments 102 in response to the one or more scheduling applications 114 to execute the workflow steps. The present invention is applicable in an operating environment where, as noted above, the one or more scheduling applications 114 and the one or more third-party software applications 118 are configured on different computing platforms (first computing platform 104 and second computing platform 106).

Both the scheduling applications 114 and the third-party software applications 118 may take many forms, and include many different types of software. For example, as noted above, each may include ActiveX controls, which are particular software tools used for enabling customized applications within other applications, such as those for gathering data, viewing certain kinds of files, displaying animation, and accessing or providing software libraries. Other examples of software applications for both scheduling applications 114 and third-party software applications 118 including device drivers, firmware, middleware, operating systems, and any other type of software application.

Framework 100 is embodied within one or more systems and/or methods that are performed in a plurality of data processing elements 132 that are components within a computing environment 130 that also includes one or more processors 134 and a plurality of software applications and hardware devices or other components. The one or more processors 134 and the plurality of software applications and hardware devices or other components are configured to execute program instructions or routines to perform the elements, components, modules, algorithms, and data processing functions described herein, and embodied within the plurality of data processing elements 132.

Input data 110 is applied to the plurality of data processing elements 132, which include a data collection and initialization component 140 that is configured to receive, ingest, request, or otherwise obtain input data 110 as noted above, and to prepare framework 100 for application in the workflow environment 108. The plurality of data processing elements 132 also include a remote actor instantiation engine 150, configured to perform functions of both an interface implementation element 160 and the server-side actor supervisor and monitoring element 170 to create, implement, and operate remote actor-based model 162 as a communications structure providing an interface 161 across which a messaging protocol 167 enables messaging between the client-side actor(s) 164 and the server-side actor(s) 166, each of which include one or more actors 121, as either one or more local proxy actors 122 serving as the client-side actor(s) 164 or one or more remote proxy actors 123 serving as the server-side actor(s) 166.

Remote actor instantiation element 150 is configured to define remote actor-based model 162 for the workflow environment 108, and interface implementation element 160 configures remote actor-based model 162 to implement interface 161, by configuring client-side actor 164 (or actors) residing on first computing platform 104, representing a local proxy actor 122 associated with one or more software elements of scheduling application 114, and configuring a remote server-side actor 166 residing on second computing platform 106 and representing a remote proxy actor 123 associated with one or more software elements of the at least one third-party software application 118.

Interface implementation element 160 may also identify and select particular actor functions, such as specific remoting functions for implementing the interface 161 and the messaging protocol 167, and to define an actor 121 hierarchy that includes both one or more parent actors 124 and one or more child (subsidiary) actors 125 and for selected actor functions to be created in remote actor-based model 162. Interface implementation element 160 may also define a strategy for the supervision and monitoring functions for each actor 121 within the remote actor-based model 162. For example, framework 100 may define parameters for the messaging protocol 167 in a remote messaging function, such as a location transparency for the messaging protocol 167 by developing code that mimics communication with one or more actors 121 hosted in remote processes in a manner that is fully location transparent as to the code. Framework 100 may also define how to connect to remote processes via a remote addressing function, and how to remotely deploy one or more actors 121 onto remote actor instances. Still further, framework 100 may define one or more specific strategies, such as for handling errors or faults in its one or more actors 121 within the actor hierarchy in response to an exception state experienced by one or more third-party instruments 102. Such functions may be customized to the needs of the scheduling application 114, workflow environment 108, or both, and may be designed and implemented to address any software integration (or lack of integration) issue experienced in the workflow environment 108.

Interface implementation element 160 creates the messaging protocol 167 with location transparency between the client-side actor 164 and the server-side actor 166, and associates the client-side actor 164 with the server-side actor 166 within the messaging protocol 167 based on these defined functions or strategies. This is accomplished at least in part by querying a remote IP address associated with the second computing platform 106 to obtain information identifying an associated path of the server-side actor 166, and sending an association message to the server-side actor 166. Such an association process within the remote actor-based model 162 is further performed by checking, at the client-side actor 164, whether a remote connection to the second computing platform 106 is open upon receiving the remote IP address, opening an outbound endpoint where no prior remote connection is open, and sending a handshake message to the server-side actor 166. The server-side actor 166 accepts an inbound association by receiving the handshake from the client-side actor 164, and communicates a reply to the association message. In such a process, the interface 161 is implemented between a client-side scheduling application 114 and the at least one server-side third-party software application 118 for incoming messages from each local proxy actor 122 and remote proxy actor 123.

Remote actor instantiation engine 150 further includes creating one or more remote actor references 168 for each remote proxy actor 123, for example from one or more actor libraries 120 for each of the one or more third-party instrument 102. This enables the present invention to create instances 182 for such actor references 168, to map back to an actor 121 that actually exists somewhere else within the remote actor-based model 162. Doing so enables the remote actor-based model 162 to direct messages to a local endpoint for that transport, by "telling" the message to go to the one or more actor references 168. This in turn delivers the message over the interface 161 established by the remote actor-based model 162 to an endpoint reader on the other side of the association. The endpoint reader is able to identify which local proxy actor 122 this network message was intended for, and delivers that message to the correct local proxy actor 122. The one or more actor references 168 therefore act as a tool to provide location transparency for messaging within the remote actor-based model 162, and enables actor code that works for local proxy actors 122 to automatically work with remote proxy actors 123, without any code modifications between the different first and second computing platforms 104 and 106.

Remote actor instantiation engine 150 further includes, as noted above, the server-side actor supervisor and monitoring element 170, which performs the plurality of remoting functions instantiated within the remote actor-based model 162 to execute remote messaging functions within the messaging protocol 167. These remoting functions enable the server-side actor supervisor and monitoring element 170 to queue and identify one or more messages 172 received from one or more third-party software applications 118 that indicate an event state, and monitors the messaging to detect such an event state 174 and determine whether one or more third-party software applications 118 or one or more third-party instruments 102 is/are in an exception state. The server-side actor supervisor and monitoring element 170 also enables messaging 176 with the client-side actor 164 to provide instructions as to the exception state experienced by the third-party software application 118, and reviews messages from the client-side actor 164 to identify a message to suspend or restart the server-side actor 166 in response to the exception event. This may include identifying a message from the client-side actor 164 to proceed with either a restart 192 or a stop 193 of the third-party software application 118 and/or the third-party instrument 102.

Actors generally are software tools that, when applied, operate as containers that enable a higher level of abstraction within concurrent, or parallel, and distributed systems. Actors are typically implemented in a hierarchical manner, in that they form a tree-like structure, with actors serving as parents to actors they have created to increase the level of abstraction. As a parent, an actor is responsible for supervising its children's failures (supervision), so that when an actor crashes, its parent can either restart or stop it, or escalate the failure up the hierarchy of actors, effectively handling the exception state internally within the actor hierarchy. This allows for the implementation of highly fault-tolerant systems generally; in the present invention, it also allows for integration of systems configured on different computing platforms that communicate using different protocols, in a fault-tolerant manner that hides the complexities of such different protocols and different computing platforms. The remote actor-based model 162 therefore replaces communication over one or more application programming interfaces between the scheduling application 114 and the third-party software application 118, so that messaging occur across the different first and second computing platforms 104 and 106 without a need for internal code modifications by either the scheduling application 114 or the at least one third-party software application 118, by opening a socket-based communication channel between the client-side actor 164 and the server-side actor 166 to configure the peer-to-peer communications infrastructure across the different first and second computing platforms 104 and 106. This ensures that communication between the scheduling application 114 and the one or more third-party software applications 118 is always active, and so that messages moving between the client-side actor 164 and the server-side actor 166 are received across the different first and second computing platforms 104 and 106.

Actors generally are message-based, in that their purpose is the processing of messages to isolate applications from each other and the protocols used in communicating messages between them. This is the case regardless of whether messages were sent to the actor from other actors (or from outside the actor system). Actors are also capable of performing many different functions in addition to or in conjunction with messaging, such as for example state modeling, behavior modeling, and supervising and monitoring child actors in hierarchical structures. As a state model, actors contain variables that reflect possible states the actor may be in (for example, a counter, set of listeners, or pending requests). As a behavior model, actors define actions to be taken in reaction to messages at particular points in time. Every time a message is processed, its content is compared to a current behavior of the actor; in the example of the present invention, to assess an event state. Because such actions may change over time, change can be accounted for by either encoding them in state variables, or adjusting the function of the actor itself at each instance of instantiating the actor model.

Other types of actors are also possible, and are within the scope of the present invention. For example, routers are special types of actors that route messages to other actors, referred to as routees. Different routers use different strategies to route messages efficiently. Routers may be used inside or outside of an actor, and may be self-contained with configuration capabilities, such as for example to dynamically resize when under a load. It is to be understood, however, that any function of any actor 121 may be implemented in the remote actor-based model 162 within framework 100, and is within the scope of the present invention. Framework 100 is therefore not to be limited to any one specific actor function discussed herein.

Remote actor instantiation engine 150 also includes a remote actor restart element 180 configured to create a new actor instance 182 when a message is received and processed from client-side actor 164 to respond to an exception event experienced by the server-side actor 166, as noted above. When such a message is received and processed from the client-side actor 164, the remote actor restart element 180 associates 184 the messaging protocol 167 with new actor instance 182, and invokes a sequence 186 for new actor instance 182 to restart 192 remote proxy actor 123 representing the failed third-party software application 118.

Framework 100 of the present invention generates output data 190 at least in the form of instructions 191 to remote proxy actor 123 controlling one or more third-party software applications 118 of one or more third-party instruments 102. Such instructions 191 may take many forms. For example, as noted above, output data 190 may be instructions 191 to restart 192 one or more third-party software applications 118 (and/or, restart 192 one or more third-party instruments 102)

within workflow environment 108. Output data 190 may also be embodied as instructions 191 to stop 193 the one or more third-party software applications 118 (and/or, stop 193 one or more third-party instruments 102) within a workflow environment 108. In either case of instructions for restart 192 or stop 193, the scheduling application's performance has not been affected by any exception state experienced by one or more third-party software applications 118 or one or more third-party instruments 102. Workflow steps controlled at least in part by the scheduling application 114 may therefore continue uninterrupted and unmolested within the workflow environment 108, due to the use of the remote actor-based model 162.

Output data 190 may also be embodied as instructions 191 to perform other functions. Output data 190 may include a reporting function 194, such as for example to generate performance reports related to error states and error handling within a workflow environment 108. Output data 190 may also include an analytics and diagnosis function 195, wherein framework 100 analyzes the exception state experienced by one or more third-party software applications 118 or one or more third-party instruments 102, and returns analytical information related to the diagnosis. Analytics generated as output data 190 may also include performance characteristics of the remote actor-based model 162, such as for example message routing timing and response timing. Output data 190 may further include an update function 196, wherein an instruction is communicated to the third-party software application 118 to update itself based on the analyzed exception state in the analytics and diagnosis function 195.

Access to framework 100 of the present invention may be provided through one or more application programming interfaces (APIs) 136 for functions other than facilitating communications between scheduling applications 114 and third-party software applications 118. APIs 136 may be provided for particular forms of output data 190, where one or more APIs 136 may be developed to enable functions such as reporting function 194 and update function 196 as discussed above. Third parties, for example, may utilize such APIs 136 to develop their own, follow-on uses of output data 190, such as to generate and export customized reports or alerts, provide updates to one or more third-party software applications 118, modify one or more third-party instruments 102, or develop their own enterprise-specific applications.

FIG. 2 is a diagram illustrating an exemplary arrangement 200 where a remote actor-based model 162 is instantiated for a workflow environment 108 according to the present invention. As shown in FIG. 2, and with further reference to FIG. 1, a client-side actor 164 comprised at least of a local proxy actor 122 sits between the scheduling applications 114, and a remote proxy actor 123 representing third-party software applications 118 at a server-side actor 166. These local proxy actors 122 and remote proxy actors 123 may be part of an actor hierarchy that includes multiple actors 121 for each of the client and server elements, such that each of the client-side actor 164 and server-side actor 166 may include multiple parent actors 124 and multiple child actors 125 for each entity represented. It is to be noted, however, that such a hierarchy may not always include both parent actor 124 and child actor 125, and may be comprised only of a single child actor 125; in addition, a hierarchy may also comprise many parent actors 124 and many subordinate child actors 125, for each third-party software application 118 as a server-side actor 166. The present invention therefore serves as an interface 161 between the scheduling application 114 and the third-party software applications 118, so that a messaging protocol 167 may be implemented for all messaging that occurs between the client-side elements and the server-side elements within framework 100.

FIG. 3 is a flowchart illustrating steps in an exemplary process 300 for performing framework 100, according to another aspect of the present invention, where computing elements on different first and second computing platforms 104 and 106 are utilized in an automated workflow environment 108. A remote actor-based model 162 is initiated and initialized for a workflow environment 108 at step 310. Input data 110 relative to instantiation of this remote actor-based model 162, and at least comprising scheduling information 112 and device information 116, is correlated for the workflow environment 108, to identify and configure a client-side actor 164 representing a local proxy for a scheduling application 114 that includes such scheduling information 112 on first computing platform 104 at step 320. At step 330, input data 110 relative to instantiation of this remote actor-based model 162 is correlated for the workflow environment 108 to identify and configure a server-side actor 166 representing a remote proxy for at least one third-party software application 118 that includes such device information 116 on a second computing platform 106. Process 300 instantiates the remote actor-based model 162 in the workflow environments to serve as an agnostic interface 161 that provides a peer-to-peer communications infrastructure between the first computing platform 104 and second computing platform 106.

Process 300 then creates a messaging protocol 167 between the client-side actor 164 and the server-side actor 166 at step 340 within such an interface 161 to enable the peer-to-peer communications infrastructure. Process 300 then associates the client-side actor 164 with the server-side actor 166 within the messaging protocol 167 created by the remote actor-based model 162 at step 350, and implements the interface 161 to begin processing incoming messages from both the local proxy and remote proxy at step 360. This may occur, according to one aspect of the present invention, by querying a remote IP address associated with the second computing platform 106 to obtain information identifying an associated path of the server-side actor 166. An association message is then sent to the server-side actor 166 by process 300, which checks, at the client-side actor 164, whether a remote connection to the second computing platform 106 is open upon receiving the remote IP address. If not, process 300 opens an outbound endpoint where no prior remote connection is open, and sends a handshake message to the server-side actor 166. The server-side actor 166 then accepts an inbound association to create the association by receiving the handshake from the client-side actor 164, and communicates a reply to the association message.

At step 370, process 300 supervises and monitors messaging across the interface 161 created in the steps outlined above, by creating one or more actor references 168 at least for each remote proxy actor 123 in the hierarchy of the server-side actor 166. At step 380, the supervisory and monitoring functions performed by framework 100 in such a communications infrastructure continue by queuing messages from the scheduling application 114, and at step 390, delivering those messages from the scheduling application 114 to the intended remote proxy actor 123 associated with one or more third-party software applications 118 and one or more third-party instruments 102.

In a further embodiment of the present invention, and as noted, framework 100 instantiates a remote actor-based model 162 to represent scheduling software and third-party software controlling one or more third-party instruments 102 in workflow environments 108 to prevent interruptions in automated workflows due to failures, particularly where such automated workflows occur with the scheduling application 114 and third-party software applications 118 configured on different computing platforms 104 and 106. The remote actor-based model 162 of framework 100 reduces recovery time during such failures that result from inconsistencies in communications protocols between scheduling software and third-party software operating on such different first and second computing platforms 104 and 106, and enables restarts of one or more third-party instruments 102 in the event of failures from crashes, hangs, and other error states in a way that does not compromise the integrity of the automated workflows.

FIG. 4 is a flowchart illustrating steps in an exemplary process 400 for performing framework 100, according to this embodiment of the present invention, where a remote actor-based model 162 is utilized to promote restarts of one or more third-party software applications 118 (and/or one or more third-party instruments 102) in the event of exception states indicating failure. A remote actor-based model 162 is initiated and initialized for a workflow environment 108 at step 410, and at step 420, process 400 identifies and configures a client-side actor 164, representing a local proxy for a scheduling application 114 on first computing platform 104. At step 430, process 400 identifies and configures a server-side actor 166 representing a remote proxy for at least one third-party software application 118 on a second computing platform 106. Process 400 therefore instantiates the remote actor-based model 162 in workflow environments 108 to serve as an agnostic interface 161 that provides a peer-to-peer communications infrastructure between first computing platform 104 and second computing platform 106. Process 400 then creates a messaging protocol 167 between the client-side actor 164 and the server-side actor 166 at step 440 within such an interface 161 to enable the peer-to-peer communications infrastructure.

At step 450, process 400 supervises and monitors messaging across the interface created by the steps outlined above as to FIG. 3, by creating one or more actor references 168 at least for each remote proxy actor 123 in the hierarchy of the server-side actor 166. At step 460, process 400 of this embodiment continues by supervising the one or more actor references 168 to identify messages representing an event state of the at least one third-party software application 118 at the server-side actor 166. From the messages communicate by the third-party software application(s) 118, at step 470 process 400 evaluates the content of messages to detect an error state comprising an exception event in the third-party software application 118, and instructs one or more actor references of the client-side actor 164 of the exception state. Process 400 also reviews messages from the client-side actor 164 to identify a message to suspend the server-side actor 166 in response to the exception event.

Where such a message to suspend is detected from the client-side actor 164, process 400 generates instructions 191 at the server-side actor 166 to stop the third-party software application 118 experiencing an exception event, and waits for instructions of a restart 192 from the client-side actor 164. Beginning at step 480, process 400 creates a new actor reference 168 for the failed server-side actor 166, creates a new actor instance 182 for each actor 121 representing the at least one third-party software application 118 within the server-side actor 166 as a remote proxy actor 123 communicating the exception event, and associates the messaging protocol 167 with the new actor instance 182 for the third-party software application 118 communicating the exception event. At step 490, process 400 invokes the sequence for the new actor instance 182 within the remote-actor based model 162, following further instructions 191 provided in messaging from the client-side actor 164 indicating a request to restart 192 the at least one third-party software application 118.

It is to be understood that the present invention is not to be limited to any particular type of workflow environment 108, and that framework 100 of the present invention may be applied to any field where automated control of instruments and/or tasks performed by such instruments is desired. For example, the workflow environment 108 may be for packaging and shipping, such as where instruments are used to identify an item to be shipped, prepare the item within a package for shipment, and scheduling a shipment of the package. Many types of workflows and workflow environments 108 are therefore possible and are within the scope of the present invention.

The systems and methods of the present invention may be implemented in many different computing environments 130. For example, they may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, GPU and any comparable means. Still further, the present invention may be implemented in cloud-based data processing environments, and where one or more types of servers are used to process large amounts of data, and using processing components such as CPUs, GPUs, TPUs, and other similar hardware. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors or general processing units), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be wholly or partially implemented in software that can be stored on a non-transitory computer-readable storage medium, executed on programmed general-purpose computer with the cooperation of a controller and memory, a special purpose computer, a microprocessor, or the like. In these instances, the systems and methods of this invention can be implemented as a program embedded on a mobile device or personal computer through such mediums as an applet, JAVA® or CGI script, as a resource residing on one or more servers or computer workstations, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, machine learning, artificial intelligence, fuzzy logic, expert system or combination of hardware and software that is capable of performing the data processing functionality described herein.

Aspects of the present specification can also be described by the following embodiments:

1. A method, comprising: receiving, as input data, information associated with a scheduling application for executing one or more workflow steps in a workflow environment, and information associated with at least one third-party software application governing operation of a third-party instrument in the workflow environment, the scheduling application and the at least one third-party software application operating on different computing platforms; integrating the input data in a plurality of data processing elements within a computing environment that includes one or more processors and at least one computer-readable non-transitory storage medium having program instructions stored therein which, when executed by the one or more processors, cause the one or more processors to execute the plurality of data processing elements to implement a remote actor-based model as an interface between the scheduling application and the at least one third-party software application to establish peer-to-peer communications across the different computing platforms, by configuring a client-side actor residing on a first computing platform, representing a local proxy associated with one or more software elements of the scheduling application, configuring a remote server-side actor residing on a second computing platform and representing a remote proxy associated with one or more software elements of the at least one third-party software application, and creating a messaging protocol having location transparency between the client-side actor residing on the first computing platform and server-side actor residing on the second computing platform, and associating the client-side actor with the server-side actor within the messaging protocol, by 1) querying a remote IP address associated with the second computing platform to obtain information identifying an associated path of the server-side actor, and sending an association message to the server-side actor, 2) checking, at the client-side actor, whether a remote connection to the second computing platform is open upon receiving the remote IP address, 3) opening an outbound endpoint where no prior remote connection is open, and 4) sending a handshake message to the server-side actor, wherein the server-side actor accepts an inbound association by receiving the handshake from the client-side actor, and communicates a reply to the association message, and implementing the interface between the scheduling application and the at least one third-party software application for incoming messages from each of the local proxy and the remote proxy, by creating one or more remote actor references for each remote actor, queueing messages from the scheduling application, and delivering the messages from the scheduling application to the remote actor intended by each message based on the one or more remote actor references and according to the associated path for each third-party instrument.

2. The method of embodiment 1, wherein the at least one third-party software application is at least one of a driver application, a firmware application, a middleware application, or an operating system application.

3. The method of embodiment 1 or 2, wherein the remote actor-based model opens a socket-based communication channel between the client-side actor and the server-side actor to configure the peer-to-peer communications infrastructure across the different computing platforms, to ensure that communication between the scheduling application and the one or more third-party software applications is always active, and so that messages moving between the client-side actor and the server-side actor are received across the different computing platforms.

4. The method of any one of embodiments 1-3, wherein the interface created by the remote actor-based model replaces communication over one or more application programming interfaces between the scheduling application and the third-party software application, so that messaging occurs across the different computing platforms without a need for internal code modifications by either the scheduling application or the at least one third-party software application.

5. The method of any one of embodiments 1-4, further comprising monitoring, at the server-side actor, an event state of the third-party instrument to which each server-side actor is assigned.

6. The method of embodiment 5, further comprising queueing event state messages from the at least one third-party software application where the event state is a fail state, and delivering the event state messages from the server-side actor to the client-side actor.

7. The method of embodiment 6, further comprising generating an instruction from the client-side actor to the server-side actor to either stop the at least one third-party software application, or restart the at least one third-party software application, in response to the event state messages.

8. The method of embodiment 7, further comprising stopping the third-party instrument in response to the instruction communicated from the scheduling application after the at least one third-party software application in response to the instruction from the client-side actor.

9. The method of embodiment 7, further comprising restarting the third-party instrument in response to the instruction communicated from the scheduling application after the at least one third-party software application in response to the instruction from the client-side actor.

10. The method of any one of embodiments 1-9, wherein the information associated with the scheduling application includes operational data, the operational data including information representing an identification of one or more tasks in performing the one or more workflow steps, and defining the third-party party instrument responsible for performing the one or more tasks.

11. A system for communication between client and server software systems configured on different computing platforms in workflow environments, comprising: a data initialization module configured to receive input data comprised of information associated with a scheduling application for executing one or more workflow steps in a workflow environment, and information associated with at least one third-party software application governing operation of a third-party instrument in the workflow environment, the scheduling application and the at least one third-party software application operating on different computing platforms; and an actor instantiation engine configured to implement a remote actor-based model as an interface between the scheduling application and the at least one third-party software application, by: configuring a client-side actor residing on a first computing platform, representing a local proxy associated with one or more software elements of the scheduling application, configuring a remote server-side actor residing on a second computing platform and representing a remote proxy associated with one or more software elements of the at least one third-party software application, creating a messaging protocol having location transparency between the client-side actor residing on the first computing platform and server-side actor residing on the second computing platform, and associating the client-side actor with the server-side actor within the messaging protocol, by 1) querying a remote IP address associated with the second computing platform to obtain information identifying an associated path of the server-side actor, and sending an association message to the server-side actor, 2) checking, at the client-side actor, whether a remote connection to the second computing platform is open upon receiving the remote IP address, 3) opening an outbound endpoint where no prior remote connection is open, and 4) sending a handshake message to the server-side actor, wherein the server-side actor accepts an inbound association by receiving the handshake from the client-side actor, and communicates a reply to the association message, wherein the interface between the scheduling application and the at least one third-party software application is implemented to handle incoming messages from each of the local proxy and the remote proxy, by creating one or more remote actor references for each remote actor, queueing messages from the scheduling application, and delivering the messages from the scheduling application to the remote actor intended by each message based on the one or more remote actor references and according to the associated path for each third-party instrument.

12. The system of embodiment 11, wherein the at least one third-party software application is at least one of a driver application, a firmware application, a middleware application, or an operating system application.

13. The system of embodiment 11 or 12, wherein the remote actor-based model opens a socket-based communication channel between the client-side actor and the server-side actor to configure the peer-to-peer communications infrastructure across the different computing platforms, to ensure that communication between the scheduling application and the one or more third-party software applications is always active, and so that messages moving between the client-side actor and the server-side actor are received across the different computing platforms.

14. The system of any one of embodiments 11-13, wherein the interface created by the remote actor-based model replaces communication over one or more application programming interfaces between the scheduling application and the third-party software application, so that messaging occurs across the different computing platforms without a need for internal code modifications by either the scheduling application or the at least one third-party software application.

15. The system of any one of embodiments 11-14, wherein the actor instantiation engine is further configured to monitor, at the server-side actor, an event state of the third-party instrument to which each server-side actor is assigned.

16. The system of embodiment 15, wherein the actor instantiation engine is further configured to queue event state messages from the at least one third-party software application where the event state is a fail state, and delivering the event state messages from the server-side actor to the client-side actor.

17. The system of embodiment 16, wherein the actor instantiation engine is further configured to generate an instruction from the client-side actor to the server-side actor to either stop the at least one third-party software application, or restart the at least one third-party software application, in response to the event state messages.

18. The system of embodiment 17, wherein the actor instantiation engine is further configured to stop the third-party instrument in response to the instruction communicated from the scheduling application after the at least one third-party software application in response to the instruction from the client-side actor.

19. The system of embodiment 17, wherein the actor instantiation engine is further configured to restart the third-party instrument in response to the instruction communicated from the scheduling application after the at least one third-party software application in response to the instruction from the client-side actor.

20. The system of any one of embodiments 11-19, wherein the information associated with the scheduling application includes operational data, the operational data including information representing an identification of one or more tasks in performing the one or more workflows, and defining the third-party party instrument responsible for performing the one or more tasks.

21. A method for communicating between client and server software systems configured on different computing platforms in workflow environments, comprising: instantiating a remote actor-based model as an interface between a scheduling application and at least one third-party software application operating on different computing platforms, the at least one third-party software application governing operation of a third-party instrument in response to the scheduling application to execute one or more workflow steps within an automated workflow environment; and applying the remote actor-based model to create a messaging protocol having location transparency between a client-side actor residing on a first computing platform, and representing a local proxy associated with one or more software elements of the scheduling application, and a remote server-side actor residing on a second computing platform and representing a remote proxy associated with one or more software elements of the at least one third-party software application; associating the client-side actor with the server-side actor within the messaging protocol, by 1) querying a remote IP address associated with the second computing platform to obtain information identifying an associated path of the server-side actor, and sending an association message to the server-side actor, 2) checking, at the client-side actor, whether a remote connection to the second computing platform is open upon receiving the remote IP address, 3) opening an outbound endpoint where no prior remote connection is open, and 4) sending a handshake message to the server-side actor, wherein the server-side actor accepts an inbound association by receiving the handshake from the client-side actor, and communicates a reply to the association message, wherein the messaging protocol establishes peer-to-peer communications across the different computing platforms within the automated workflow environment for incoming messages from each of the local proxy and the remote proxy, by creating one or more remote actor references for each remote actor, queueing messages from the scheduling application, and delivering the messages from the scheduling application to the remote actor intended by each message based on the one or more remote actor references and according to the associated path for each third-party instrument.

22. The method of embodiment 21, wherein the at least one third-party software application is at least one of a driver application, a firmware application, a middleware application, or an operating system application.

23. The method of embodiment 21 or 22, wherein the remote actor-based model opens a socket-based communication channel between the client-side actor and the server-side actor to configure the peer-to-peer communications infrastructure across the different computing platforms, to ensure that communication between the scheduling application and the one or more third-party software applications is always active, and so that messages moving between the client-side actor and the server-side actor are received across the different computing platforms.

24. The method of any one of embodiments 21-23, wherein the interface created by the remote actor-based model replaces communication over one or more application programming interfaces between the scheduling application and the third-party software application, so that messaging occurs across the different computing platforms without a need for internal code modifications by either the scheduling application or the at least one third-party software application.

25. The method of any one of embodiments 21-24, further comprising monitoring, at the server-side actor, an event state of the third-party instrument to which each server-side actor is assigned.

26. The method of embodiment 25, further comprising queueing event state messages from the at least one third-party software application where the event state is a fail state, and delivering the event state messages from the server-side actor to the client-side actor.

27. The method of embodiment 26, further comprising generating an instruction from the client-side actor to the server-side actor to either stop the at least one third-party software application, or restart the at least one third-party software application, in response to the event state messages.

28. The method of embodiment 27, further comprising stopping the third-party instrument in response to the instruction communicated from the scheduling application after the at least one third-party software application in response to the instruction from the client-side actor.

29. The method of embodiment 27, further comprising restarting the third-party instrument in response to the instruction communicated from the scheduling application after the at least one third-party software application in response to the instruction from the client-side actor.

30. The method of any one of embodiments 21-29, wherein the information associated with the scheduling application includes operational data, the operational data including information representing an identification of one or more tasks in performing the one or more workflows, and defining the third-party party instrument responsible for performing the one or more tasks.

31. A system for communication between client and server software systems configured on different computing platforms in workflow environments, comprising: in a workflow environment for executing one or more workflow steps, a third-party instrument controlled by at least one third-party software application, and a scheduler controlled by a scheduling application, each of the third-party instrument and the scheduler generating information across different computing platforms; and an interface between the scheduling application and the at least one third-party software application, the interface implementing a remote actor-based model by: configuring a client-side actor residing on a first computing platform, representing a local proxy associated with one or more software elements of the scheduling application controlling the scheduler, configuring a remote server-side actor residing on a second computing platform and representing a remote proxy associated with one or more software elements of the at least one third-party software application controlling the third-party instrument, creating a messaging protocol having location transparency between the client-side actor residing on the first computing platform and server-side actor residing on the second computing platform, and associating the client-side actor with the server-side actor within the messaging protocol, by 1) querying a remote IP address associated with the second computing platform to obtain information identifying an associated path of the server-side actor, and sending an association message to the server-side actor, 2) checking, at the client-side actor, whether a remote connection to the second computing platform is open upon receiving the remote IP address, 3) opening an outbound endpoint where no prior remote connection is open, and 4) sending a handshake message to the server-side actor, wherein the server-side actor accepts an inbound association by receiving the handshake from the client-side actor, and communicates a reply to the association message, wherein the interface handles incoming messages from each of the local proxy and the remote proxy, by creating one or more remote actor references for each remote actor, queueing messages from the scheduler, and delivering the messages from the scheduler to the remote actor intended by each message based on the one or more remote actor references and according to the associated path for each third-party instrument.

32. The system of embodiment 31, wherein the at least one third-party software application is at least one of a driver application, a firmware application, a middleware application, or an operating system application.

33. The system of embodiment 31 or 32, wherein the remote actor-based model opens a socket-based communication channel between the client-side actor and the server-side actor to configure the peer-to-peer communications infrastructure across the different computing platforms, to ensure that communication between the scheduler and the third-party instrument is always active, and so that messages moving between the client-side actor and the server-side actor are received across the different computing platforms.

34. The system of any one of embodiments 31-33, wherein the interface created by the remote actor-based model replaces communication over one or more application programming interfaces between the scheduler and the third-party instrument, so that messaging occurs across the different computing platforms without a need for internal code modifications by either the scheduling application or the at least one third-party software application.

35. The system of any one of embodiments 31-34, wherein the actor instantiation engine is further configured to monitor, at the server-side actor, an event state of the third-party instrument to which each server-side actor is assigned.

36. The system of embodiment 35, wherein the actor instantiation engine is further configured to queue event state messages from the third-party instrument where the event state is a fail state, and delivering the event state messages from the server-side actor to the client-side actor.

37. The system of embodiment 36, wherein the actor instantiation engine is further configured to generate an instruction from the client-side actor to the server-side actor to either stop the third-party instrument, or restart the at least one third-party software application, in response to the event state messages.

38. The system of embodiment 37, wherein the actor instantiation engine is further configured to stop the third-party instrument in response to the instruction communicated from the scheduling application after the at least one third-party software application in response to the instruction from the client-side actor.

39. The system of embodiment 37, wherein the actor instantiation engine is further configured to restart the third-party instrument in response to the instruction communicated from the scheduling application after the at least one third-party software application in response to the instruction from the client-side actor.

40. The system of any one of embodiments 31-39, wherein the information generated by the scheduling application includes operational data, the operational data including information representing an identification of one or more tasks in performing the one or more workflows, and defining the third-party party instrument responsible for performing the one or more tasks.

41. A method, comprising: instantiating a remote actor-based model between a scheduling application for executing one or more workflow steps in a workflow environment, and at least one third-party software application governing operation of a third-party instrument in the workflow environment, the remote actor-based model establishing an interface for peer-to-peer communications across different computing platforms on which the scheduling application and the at least one third-party software application are operable, by configuring a client-side actor residing on a first computing platform, representing a local proxy associated with one or more software elements of the scheduling application, configuring a remote server-side actor residing on a second computing platform and representing a remote proxy associated with one or more software elements of the at least one third-party software application, creating a messaging protocol having location transparency between the client-side actor residing on the first computing platform and server-side actor residing on the second computing platform, and creating one or more remote actor references for each remote actor in the client-side actor, and each remote actor in the server-side actor; and monitoring an operability of the at least one third-party software application within the remote actor-based model, by supervising each actor reference to identify one or more messages communicated from the server-side actor to the client-side actor and indicating an event state of the at least one third-party software application, detecting an error state comprising an exception event in the at least one third-party software application from the one or more messages communicated from the server-side actor to the client-side actor, instructing one or more actor references of the client-side actor of the exception state, and reviewing one or more messages from the client-side actor to identify an instruction to suspend the server-side actor in response to the exception event; and resuming the server-side actor following the exception event, by creating a new actor instance for each actor representing the at least one third-party software application within the server-side actor communicating the exception event, associating the messaging protocol with the new actor instance for the at least one third-party software application communicating the exception event, and invoking a sequence within the remote-actor based model for the new actor instance indicating a request to restart the at least one third-party software application.

42. The method of embodiment 41, wherein the at least one third-party software application is at least one of a driver application, a firmware application, a middleware application, or an operating system application.

43. The method of embodiment 41 or 42, wherein the information associated with the scheduling application includes operational data, the operational data including information representing an identification of one or more tasks in performing the one or more workflow steps, and defining the third-party party instrument responsible for performing the one or more tasks.

44. The method of any one of embodiments 41-43, wherein the remote actor-based model opens a socket-based communication channel between the client-side actor and the server-side actor to configure the peer-to-peer communications infrastructure across the different computing platforms, to ensure that communication between the scheduling application and the one or more third-party software applications is always active, and so that messages moving between the client-side actor and the server-side actor are received across the different computing platforms.

45. The method of any one of embodiments 41-44, wherein the interface created by the remote actor-based model replaces communication over one or more application programming interfaces between the scheduling application and the third-party software application, so that messaging occurs across the different computing platforms without a need for internal code modifications by either the scheduling application or the at least one third-party software application.

46. The method of any one of embodiments 41-45, wherein the remote actor-based model represents the at least one third-party software application as a recursive exception handling structure independent of the scheduling application to protect scheduling application integrity.

47. The method of embodiment 46, wherein the remote actor-based model invokes an actor hierarchy on at least the server-side actor, the actor hierarchy including at least one parent actor and at least one child actor for each third-party instrument in the automated workflow environment.

48. The method of embodiment 47, wherein the monitoring an operability of the at least one third-party software application within the remote actor-based model further comprises suspending all normal messaging between the client-side actor and the server-side actor until the exception event is resolved.

49. The method of embodiment 48, wherein the monitoring an operability of the at least one third-party software application within the remote actor-based model further comprises suspending all child actors in an actor hierarchy comprising the server-side actor.

50. The method of any one of embodiments 41-49, wherein the resuming the server-side actor following the exception event further comprises invoking a sequence within the remote-actor based model for the new actor instance indicating a request to stop the at least one third-party software application.

51. A system for restarting server-side third-party software systems in automated workflow environments managed by a scheduling application configured across different computing platforms, comprising: a data initialization module configured to receive input data comprised of information associated with a scheduling application for executing one or more workflow steps in a workflow environment, and information associated with at least one third-party software application governing operation of a third-party instrument in the workflow environment, the scheduling application and the at least one third-party software application operating on different computing platforms; and an actor instantiation engine configured to implement a remote actor-based model as an interface between the scheduling application and the at least one third-party software application, by: configuring a client-side actor residing on a first computing platform, representing a local proxy associated with one or more software elements of the scheduling application, configuring a remote server-side actor residing on a second computing platform and representing a remote proxy associated with one or more software elements of the at least one third-party software application, creating a messaging protocol having location transparency between the client-side actor residing on the first computing platform and server-side actor residing on the second computing platform, creating one or more remote actor references for each remote actor in the client-side actor, and each remote actor in the server-side actor; and a server-side actor supervisor, configured to monitor operability of the at least one third-party software application within the remote actor-based model, by supervising each actor reference to identify one or more messages communicated from the server-side actor to the client-side actor and indicating an event state of the at least one third-party software application, detecting an error state comprising an exception event in the at least one third-party software application from the one or more messages communicated from the server-side actor to the client-side actor, instructing one or more actor references of the client-side actor of the exception state, and reviewing one or more messages from the client-side actor to identify an instruction to suspend the server-side actor in response to the exception event, wherein the server-side actor is resumed following the exception event, by creating a new actor instance for each actor representing the at least one third-party software application within the server-side actor communicating the exception event, associating the messaging protocol with the new actor instance for the at least one third-party software application communicating the exception event, and invoking a sequence within the remote-actor based model for the new actor instance indicating a request to restart the at least one third-party software application.

52. The system of embodiment 51, wherein the at least one third-party software application is at least one of a driver application, a firmware application, a middleware application, or an operating system application.

53. The system of embodiment 51 or 52, wherein the information associated with the scheduling application includes operational data, the operational data including information representing an identification of one or more tasks in performing the one or more workflow steps, and defining the third-party party instrument responsible for performing the one or more tasks.

54. The system of any one of embodiments 51-53, wherein the remote actor-based model opens a socket-based communication channel between the client-side actor and the server-side actor to configure the peer-to-peer communications infrastructure across the different computing platforms, to ensure that communication between the scheduling application and the one or more third-party software applications is always active, and so that messages moving between the client-side actor and the server-side actor are received across the different computing platforms.

55. The system of any one of embodiments 51-54, wherein the interface created by the remote actor-based model replaces communication over one or more application programming interfaces between the scheduling application and the third-party software application, so that messaging occurs across the different computing platforms without a need for internal code modifications by either the scheduling application or the at least one third-party software application.

56. The system of any one of embodiments 51-55, wherein the remote actor-based model represents the at least one third-party software application as a recursive exception handling structure independent of the scheduling application to protect scheduling application integrity.

57. The system of embodiment 56, wherein the remote actor-based model invokes an actor hierarchy on at least the server-side actor, the actor hierarchy including at least one parent actor and at least one child actor for each third-party instrument in the automated workflow environment.

58. The system of embodiment 57, wherein the server-side actor supervisor is further configured to suspend all normal messaging between the client-side actor and the server-side actor until the exception event is resolved.

59. The system of embodiment 58, wherein the server-side actor supervisor is further configured to suspend all child actors in an actor hierarchy comprising the server-side actor.

60. The system of any one of embodiments 51-59, wherein the server-side actor is stopped following the exception event, by invoking a sequence within the remote-actor based model for the new actor instance indicating a request to stop the at least one third-party software application.

61. A method for restarting server-side third-party software systems in automated workflow environments managed by a scheduling application configured across different computing platforms, comprising: receiving, as input data, information associated with a scheduling application for executing one or more workflow steps in a workflow environment, and information associated with at least one third-party software application governing operation of a third-party instrument in the workflow environment, the scheduling application and the at least one third-party software application operating on different computing platforms; integrating the input data in a plurality of data processing elements within a computing environment that includes one or more processors and at least one computer-readable non-transitory storage medium having program instructions stored therein which, when executed by the one or more processors, cause the one or more processors to execute the plurality of data processing elements to implement a remote actor-based model as an interface between the scheduling application and the at least one third-party software application to establish peer-to-peer communications across the different computing platforms and monitor operability of the at least one third-party software application within the remote actor-based model, by configuring a client-side actor residing on a first computing platform, representing a local proxy associated with one or more software elements of the scheduling application, configuring a remote server-side actor residing on a second computing platform and representing a remote proxy associated with one or more software elements of the at least one third-party software application, creating a messaging protocol having location transparency between the client-side actor residing on the first computing platform and server-side actor residing on the second computing platform, creating one or more remote actor references for each remote actor in the client-side actor, and each remote actor in the server-side actor, supervising each actor reference to identify one or more messages communicated from the server-side actor to the client-side actor and indicating an event state of the at least one third-party software application, detecting an error state comprising an exception event in the at least one third-party software application from the one or more messages communicated from the server-side actor to the client-side actor, instructing one or more actor references of the client-side actor of the exception state, and reviewing one or more messages from the client-side actor to identify an instruction to suspend the server-side actor in response to the exception event; and generating, as output data, a sequence to restart the server-side actor, by creating a new actor instance for each actor representing the at least one third-party software application within the server-side actor communicating the exception event, associating the messaging protocol with the new actor instance for the at least one third-party software application communicating the exception event, and invoking the sequence within the remote-actor based model for the new actor instance indicating a request to restart the at least one third-party software application.

62. The method of embodiment 61, wherein the at least one third-party software application is at least one of a driver application, a firmware application, a middleware application, or an operating system application.

63. The method of embodiment 61 or 62, wherein the information associated with the scheduling application includes operational data, the operational data including information representing an identification of one or more tasks in performing the one or more workflow steps, and defining the third-party party instrument responsible for performing the one or more tasks.

64. The method of any one of embodiments 61-63, wherein the remote actor-based model opens a socket-based communication channel between the client-side actor and the server-side actor to configure the peer-to-peer communications infrastructure across the different computing platforms, to ensure that communication between the scheduling application and the one or more third-party software applications is always active, and so that messages moving between the client-side actor and the server-side actor are received across the different computing platforms.

65. The method of any one of embodiments 61-64, wherein the interface created by the remote actor-based model replaces communication over one or more application programming interfaces between the scheduling application and the third-party software application, so that messaging occurs across the different computing platforms without a need for internal code modifications by either the scheduling application or the at least one third-party software application.

66. The method of any one of embodiments 61-65, wherein the remote actor-based model represents the at least one third-party software application as a recursive exception handling structure independent of the scheduling application to protect scheduling application integrity.

67. The method of embodiment 66, wherein the remote actor-based model invokes an actor hierarchy on at least the server-side actor, the actor hierarchy including at least one parent actor and at least one child actor for each third-party instrument in the automated workflow environment.

68. The method of embodiment 67, wherein the supervising each actor reference further comprises suspending all normal messaging between the client-side actor and the server-side actor until the exception event is resolved.

69. The method of embodiment 68, wherein the supervising each actor reference further comprises suspending all child actors in an actor hierarchy comprising the server-side actor.

70. The method of any one of embodiments 61-69, wherein the output data further comprises a sequence for the new actor instance that indicates a request to stop the at least one third-party software application.

71. A system, comprising: In a workflow environment for executing one or more workflow steps, a third-party instrument controlled by at least one third-party software application, and a scheduler controlled by a scheduling application, each of the third-party instrument and the scheduler generating information across different computing platforms; and an interface between the scheduling application and the at least one third-party software application, the interface implementing a remote actor-based model by: configuring a client-side actor residing on a first computing platform, representing a local proxy associated with the scheduler and the scheduling application, configuring a remote server-side actor residing on a second computing platform and representing a remote proxy associated with the third-party instrument and the at least one third-party software application, creating a messaging protocol having location transparency between the client-side actor residing on the first computing platform and server-side actor residing on the second computing platform, creating one or more remote actor references for each remote actor in the client-side actor, and each remote actor in the server-side actor; and a server-side actor supervisor, configured to monitor operability of the at least one third-party software application within the remote actor-based model, by supervising each actor reference to identify one or more messages communicated from the server-side actor to the client-side actor and indicating an event state of the at least one third-party software application, detecting an error state comprising an exception event in the at least one third-party software application from the one or more messages communicated from the server-side actor to the client-side actor, instructing one or more actor references of the client-side actor of the exception state, and reviewing one or more messages from the client-side actor to identify an instruction to suspend the server-side actor in response to the exception event, wherein the server-side actor is resumed following the exception event, by creating a new actor instance for each actor representing the at least one third-party software application within the server-side actor communicating the exception event, associating the messaging protocol with the new actor instance for the at least one third-party software application communicating the exception event, and invoking a sequence within the remote-actor based model for the new actor instance indicating a request to restart the at least one third-party software application.

72. The system of embodiment 71, wherein the at least one third-party software application is at least one of a driver application, a firmware application, a middleware application, or an operating system application.

73. The system of embodiment 71 or 72, wherein the information generated by the scheduling application includes operational data, the operational data including information representing an identification of one or more tasks in performing the one or more workflow steps, and defining the third-party party instrument responsible for performing the one or more tasks.

74. The system of any one of embodiments 71-73, wherein the remote actor-based model opens a socket-based communication channel between the client-side actor and the server-side actor to configure the peer-to-peer communications infrastructure across the different computing platforms, to ensure that communication between the scheduler and the third-party instrument is always active, and so that messages moving between the client-side actor and the server-side actor are received across the different computing platforms.

75. The system of any one of embodiments 71-74, wherein the interface created by the remote actor-based model replaces communication over one or more application programming interfaces between the scheduler and the third-party instrument, so that messaging occurs across the different computing platforms without a need for internal code modifications by either the scheduling application or the at least one third-party software application.

76. The system of any one of embodiments 71-75, wherein the remote actor-based model represents the at least one third-party software application as a recursive exception handling structure independent of the scheduling application to protect scheduling application integrity.

77. The system of embodiment 76, wherein the remote actor-based model invokes an actor hierarchy on at least the server-side actor, the actor hierarchy including at least one parent actor and at least one child actor for each third-party instrument in the automated workflow environment.

78. The system of embodiment 77, wherein the server-side actor supervisor is further configured to suspend all normal messaging between the client-side actor and the server-side actor until the exception event is resolved.

79. The system of embodiment 78, wherein the server-side actor supervisor is further configured to suspend all child actors in an actor hierarchy comprising the server-side actor.

80. The system of any one of embodiments 71-79, wherein the server-side actor is stopped following the exception event, by invoking a sequence within the remote-actor based model for the new actor instance indicating a request to stop the at least one third-party software application.

In closing, foregoing descriptions of embodiments of the present invention have been presented for the purposes of illustration and description. It is to be understood that, although aspects of the present invention are highlighted by referring to specific embodiments, one skilled in the art will readily appreciate that these described embodiments are only illustrative of the principles comprising the present invention. As such, the specific embodiments are not intended to be exhaustive or to limit the invention to the precise forms disclosed. Therefore, it should be understood that embodiments of the disclosed subject matter are in no way limited to a particular element, compound, composition, component, article, apparatus, methodology, use, protocol, step, and/or limitation described herein, unless expressly stated as such.

In addition, groupings of alternative embodiments, elements, steps and/or limitations of the present invention are not to be construed as limitations. Each such grouping may be referred to and claimed individually or in any combination with other groupings disclosed herein. It is anticipated that one or more alternative embodiments, elements, steps and/or limitations of a grouping may be included in, or deleted from, the grouping for reasons of convenience and/or patentability. When any such inclusion or deletion occurs, the specification is deemed to contain the grouping as modified, thus fulfilling the written description of all Markush groups used in the appended claims.

Furthermore, those of ordinary skill in the art will recognize that certain changes, modifications, permutations, alterations, additions, subtractions, and sub-combinations thereof can be made in accordance with the teachings herein without departing from the spirit of the present invention. Furthermore, it is intended that the following appended claims and claims hereafter introduced are interpreted to include all such changes, modifications, permutations, alterations, additions, subtractions, and sub-combinations as are within their true spirit and scope. Accordingly, the scope of the present invention is not to be limited to that precisely as shown and described by this specification.

Certain embodiments of the present invention are described herein, including the best mode known to the inventors for conducting the invention. Of course, variations on these described embodiments will become apparent to those of ordinary skill in the art upon reading the foregoing description. The inventor expects skilled artisans to employ such variations as appropriate, and the inventors intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

The words, language, and terminology used in this specification is for the purpose of describing particular embodiments, elements, steps and/or limitations only and is not intended to limit the scope of the present invention, which is defined solely by the claims. In addition, such words, language, and terminology are to be understood not only in the sense of their commonly defined meanings, but to include by special definition in this specification structure, material or acts beyond the scope of the commonly defined meanings. Thus, if an element, step or limitation can be understood in the context of this specification as including more than one meaning, then its use in a claim must be understood as being generic to all possible meanings supported by the specification and by the word itself.

The definitions and meanings of the elements, steps or limitations recited in a claim set forth below are, therefore, defined in this specification to include not only the combination of elements, steps or limitations which are literally set forth, but all equivalent structure, material or acts for performing substantially the same function in substantially the same way to obtain substantially the same result. In this sense it is therefore contemplated that an equivalent substitution of two or more elements, steps and/or limitations may be made for any one of the elements, steps or limitations in a claim set forth below or that a single element, step, or limitation may be substituted for two or more elements, steps and/or limitations in such a claim. Although elements, steps or limitations may be described above as acting in certain combinations and even initially claimed as such, it is to be expressly understood that one or more elements, steps and/or limitations from a claimed combination can in some cases be excised from the combination and that the claimed combination may be directed to a sub-combination or variation of a sub-combination. As such, notwithstanding the fact that the elements, steps and/or limitations of a claim are set forth below in a certain combination, it must be expressly understood that the invention includes other combinations of fewer, more, or different elements, steps and/or limitations, which are disclosed in above combination even when not initially claimed in such combinations. Furthermore, insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. Accordingly, the claims are thus to be understood to include what is specifically illustrated and described above, what is conceptually equivalent, what can be obviously substituted and also what essentially incorporates the essential idea of the invention.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. For instance, as mass spectrometry instruments can vary slightly in determining the mass of a given analyte, the term "about" in the context of the mass of an ion or the mass/charge ratio of an ion refers to +/−0.50 atomic mass unit. At the very least, and not as an attempt to limit the application of the doctrine of equivalents to the scope of the claims, each numerical indication should at least be construed in light of the number of reported significant digits and by applying ordinary rounding techniques.

Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a comparable manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as, e.g., "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising", variations thereof such as, e.g., "comprise" and "comprises", and equivalent open-ended transitional phrases thereof like "including", "containing" and "having", encompass all the expressly recited elements, limitations, steps, integers, and/or features alone or in combination with unrecited subject matter; the named elements, limitations, steps, integers, and/or features are essential, but other unnamed elements, limitations, steps, integers, and/or features may be added and still form a construct within the scope of the claim. Specific embodiments disclosed herein may be further limited in the claims using the closed-ended transitional phrases "consisting of" or "consisting essentially of" (or variations thereof such as, e.g., "consist of", "consists of", "consist essentially of", and "consists essentially of") in lieu of or as an amendment for "comprising." When used in the claims, whether as filed or added per amendment, the closed-ended transitional phrase "consisting of" excludes any element, limitation, step, integer, or feature not expressly recited in the claims. The closed-ended transitional phrase "consisting essentially of" limits the scope of a claim to the expressly recited elements, limitations, steps, integers, and/or features and any other elements, limitations, steps, integers, and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps, integers, and/or features specifically recited in the claim, whereas the meaning of the closed-ended transitional phrase "consisting essentially of" is being defined as only including those elements, limitations, steps, integers, and/or features specifically recited in the claim and those elements, limitations, steps, integers, and/or features that do not materially affect the basic and novel characteristic(s) of the claimed subject matter. Therefore, the open-ended transitional phrase "comprising" (and equivalent open-ended transitional phrases thereof) includes within its meaning, as a limiting case, claimed subject matter specified by the closed-ended transitional phrases "consisting of" or "consisting essentially of." As such, the embodiments described herein or so claimed with the phrase "comprising" expressly and unambiguously provide description, enablement, and support for the phrases "consisting essentially of" and "consisting of."

Lastly, all patents, patent publications, and other references cited and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. The reference to any prior art in this specification is not, and should not be taken as, an acknowledgement or any form of suggestion that the prior art forms part of the common general knowledge from any country. In addition, nothing in this regard is or should be construed as an admission that the inventors are not entitled to antedate such disclosure by virtue of prior invention or for any other reason. All statements as to the date or representation as to the contents of these documents are based on the information available to the applicant and do not constitute any admission as to the correctness of the dates or contents of these documents.

The invention claimed is:

1. A method, comprising:

receiving, as input data, information associated with a scheduling application for executing one or more workflow steps in a workflow environment, and information associated with at least one third-party software application governing operation of a third-party instrument that performs an automated robotic activity in the workflow environment, the scheduling application and the at least one third-party software application operating on different computing platforms;

integrating the input data in a plurality of data processing elements within a computing environment that includes one or more processors and at least one computer-readable non-transitory storage medium having program instructions stored therein which, when executed by the one or more processors, cause the one or more processors to execute the plurality of data processing elements to implement a remote actor-based model as an interface between the scheduling application and the at least one third-party software application to establish peer-to-peer communications across the different computing platforms for executing the automated robotic activity, by configuring a client-side actor residing on a first computing platform, representing a local proxy associated with one or more software elements of the scheduling application, configuring a remote server-side actor residing on a second computing platform and representing a remote proxy associated with one or more software elements of the at least one third-party software application, and creating a messaging protocol having location transparency between the client-side actor residing on the first computing platform and server-side actor residing on the second computing platform, and associating the client-side actor with the server-side actor within the messaging protocol, by 1) querying a remote IP address associated with the second computing platform to obtain information identifying an associated path of the server-side actor, and sending an association message to the server-side actor, 2) checking, at the client-side actor, whether a remote connection to the second computing platform is open upon receiving the remote IP address, 3) opening an outbound endpoint where no prior remote connection is open, and 4) sending a handshake message to the server-side actor, wherein the server-side actor accepts an inbound association by receiving the handshake from the client-side actor, and communicates a reply to the association message; and implementing the interface between the scheduling application and the at least one third-party software application for incoming messages from each of the local proxy and the remote proxy to execute the automated robotic activity, by creating one or more remote actor references for each remote actor, queueing messages from the scheduling application, and delivering the messages from the scheduling application to the remote actor intended by each message based on the one or more remote actor references and according to the associated path for each third-party instrument, wherein the remote actor-based model is comprised of the client-side actor and the server-side actor, each of the client-side actor and the server-side actor operating as a container that isolates the scheduling application and the third-party software application from each other to replace communication between the scheduling application and the third-party software application with the interface to enable operation of the third-party instrument in association with the scheduling application to perform the automated robotic activity, and wherein the remote actor-based model enables a software update of the at least one third-party software application and a modification of the third-party instrument without interruption of the scheduling application and regardless of whether the at least one third-party software application and the third-party instrument are integrated with the scheduling application.

2. The method of claim 1, wherein the at least one third-party software application is at least one of a driver application, a firmware application, a middleware application, or an operating system application.

3. The method of claim 1, wherein the remote actor-based model opens a socket-based communication channel between the client-side actor and the server-side actor to configure the peer-to-peer communications infrastructure across the different computing platforms, to ensure that communication between the scheduling application and the one or more third-party software applications is always active, and so that messages moving between the client-side actor and the server-side actor are received across the different computing platforms.

4. The method of claim 1, wherein the interface created by the remote actor-based model replaces communication over one or more application programming interfaces between the scheduling application and the third-party software application, so that messaging occurs across the different computing platforms without a need for internal code modifications by either the scheduling application or the at least one third-party software application.

5. The method of claim 1, further comprising monitoring, at the server-side actor, an event state of the third-party instrument to which each server-side actor is assigned.

6. The method of claim 5, further comprising queueing event state messages from the at least one third-party software application where the event state is a fail state, and delivering the event state messages from the server-side actor to the client-side actor.

7. The method of claim 6, further comprising generating an instruction from the client-side actor to the server-side actor to either stop the at least one third-party software application, or restart the at least one third-party software application, in response to the event state messages.

8. A system for communication between client and server software systems configured on different computing platforms in workflow environments, comprising:

a computing environment having at least one processor that receives input data comprised of information associated with a scheduling application for executing one or more workflow steps in a workflow environment, and information associated with at least one third-party software application governing operation of a third-party instrument that performs an automated robotic activity in the workflow environment, the scheduling application and the at least one third-party software application operating on different computing platforms; and a remote actor-based model implemented by the at least one processor as an interface between the scheduling application and the at least one third-party software application, by:

configuring a client-side actor residing on a first computing platform, representing a local proxy associated with one or more software elements of the scheduling application, configuring a remote server-side actor residing on a second computing platform and representing a remote proxy associated with one or more software elements of the at least one third-party software application, creating a messaging protocol having location transparency between the client-side actor residing on the first computing platform and server-side actor residing on the second computing platform, and associating the client-side actor with the server-side actor within the messaging protocol, by 1) querying a remote IP address associated with the second computing platform to obtain information identifying an associated path of the server-side actor, and sending an association message to the server-side actor, 2) checking, at the client-side actor, whether a remote connection to the second computing platform is open upon receiving the remote IP address, 3) opening an outbound endpoint where no prior remote connection is open, and 4) sending a handshake message to the server-side actor, wherein the server-side actor accepts an inbound association by receiving the handshake from the client-side actor, and communicates a reply to the association message, wherein the interface between the scheduling application and the at least one third-party software application is implemented to handle incoming messages from each of the local proxy and the remote proxy to execute the automated robotic activity, by creating one or more remote actor references for each remote actor, queueing messages from the scheduling application, and delivering the messages from the scheduling application to the remote actor intended by each message based on the one or more remote actor references and according to the associated path for each third-party instrument, and wherein the remote actor-based model is comprised of the client-side actor and the server-side actor, each of the client-side actor and the server-side actor operating as a container that isolates the scheduling application and the third-party software application from each other to replace communication between the scheduling application and the third-party software application with the interface to enable operation of the third-party instrument in association with the scheduling application to perform the automated robotic activity, and wherein the remote actor-based model enables a software update of the at least one third-party software application and a modification of the third-party instrument without interruption of the scheduling application and regardless of whether the at least one third-party software application and the third-party instrument are integrated with the scheduling application.

9. The system of claim 8, wherein the at least one third-party software application is at least one of a driver application, a firmware application, a middleware application, or an operating system application.

10. The system of claim 8, wherein the remote actor-based model opens a socket-based communication channel between the client-side actor and the server-side actor to configure the peer-to-peer communications infrastructure across the different computing platforms, to ensure that communication between the scheduling application and the one or more third-party software applications is always active, and so that messages moving between the client-side actor and the server-side actor are received across the different computing platforms.

11. The system of claim 8, wherein the interface created by the remote actor-based model replaces communication over one or more application programming interfaces between the scheduling application and the third-party software application, so that messaging occurs across the different computing platforms without a need for internal code modifications by either the scheduling application or the at least one third-party software application.

12. The system of claim 8, wherein the remote actor-based model is further configured to monitor, at the server-side actor, an event state of the third-party instrument to which each server-side actor is assigned.

13. The system of claim 12, wherein the remote actor-based model is further configured to queue event state messages from the at least one third-party software application where the event state is a fail state, and delivering the event state messages from the server-side actor to the client-side actor.

14. The system of claim 13, wherein the remote actor-based model is further configured to generate an instruction from the client-side actor to the server-side actor to either stop the at least one third-party software application, or restart the at least one third-party software application, in response to the event state messages.

15. A method for communicating between client and server software systems configured on different computing platforms in workflow environments, comprising:

instantiating a remote actor-based model as an interface between a scheduling application and at least one third-party software application operating on different computing platforms, the at least one third-party software application governing operation of a third-party instrument that performs an automated robotic activity in response to the scheduling application to execute one or more workflow steps within an automated workflow environment;

applying the remote actor-based model to create a messaging protocol having location transparency between a client-side actor residing on a first computing platform, and representing a local proxy associated with one or more software elements of the scheduling application, and a remote server-side actor residing on a second computing platform and representing a remote proxy associated with one or more software elements of the at least one third-party software application; and associating the client-side actor with the server-side actor within the messaging protocol, by 1) querying a remote IP address associated with the second computing platform to obtain information identifying an associated path of the server-side actor, and sending an association message to the server-side actor, 2) checking, at the client-side actor, whether a remote connection to the second computing platform is open upon receiving the remote IP address, 3) opening an outbound endpoint where no prior remote connection is open, and 4) sending a handshake message to the server-side actor, wherein the server-side actor accepts an inbound association by receiving the handshake from the client-side actor, and communicates a reply to the association message, wherein the messaging protocol establishes peer-to-peer communications across the different computing platforms for executing the automated robotic activity within the automated workflow environment for incoming messages from each of the local proxy and the remote proxy, by creating one or more remote actor references for each remote actor, queueing messages from the scheduling application, and delivering the messages from the scheduling application to the remote actor intended by each message based on the one or more remote actor references and according to the associated path for each third-party instrument, and wherein the remote actor-based model is comprised of the client-side actor and the server-side actor, each of the client-side actor and the server-side actor operating as a container that isolates the scheduling application and the third-party software application from each other to replace communication between the scheduling application and the third-party software application with the interface to enable operation of the third-party instrument in association with the scheduling application to perform the automated robotic activity, and wherein the remote actor-based model enables a software update of the at least one third-party software application and a modification of the third-party instrument without interruption of the scheduling application and regardless of whether the at least one third-party software application and the third-party instrument are integrated with the scheduling application.

16. The method of claim 15, wherein the at least one third-party software application is at least one of a driver application, a firmware application, a middleware application, or an operating system application.

17. The method of claim 15, wherein the remote actor-based model opens a socket-based communication channel between the client-side actor and the server-side actor to configure the peer-to-peer communications infrastructure across the different computing platforms, to ensure that communication between the scheduling application and the one or more third-party software applications is always active, and so that messages moving between the client-side actor and the server-side actor are received across the different computing platforms.

18. The method of claim 15, wherein the interface created by the remote actor-based model replaces communication over one or more application programming interfaces between the scheduling application and the third-party software application, so that messaging occurs across the different computing platforms without a need for internal code modifications by either the scheduling application or the at least one third-party software application.

19. The method of claim 15, further comprising monitoring, at the server-side actor, an event state of the third-party instrument to which each server-side actor is assigned.

20. The method of claim 19, further comprising queueing event state messages from the at least one third-party software application where the event state is a fail state, and delivering the event state messages from the server-side actor to the client-side actor.

21. The method of claim 20, further comprising generating an instruction from the client-side actor to the server-side actor to either stop the at least one third-party software application, or restart the at least one third-party software application, in response to the event state messages.

* * * * *